March 17, 1964     G. K. SNUGGINS     3,125,355

CHAIN ANCHOR

Filed Nov. 20, 1961

INVENTOR.
GEORGE H. SNUGGINS
BY
Fishburn and Gold
ATTORNEYS

3,125,355
CHAIN ANCHOR
George K. Snuggins, Box 25, Tiff City, Mo.
Filed Nov. 20, 1961, Ser. No. 153,408
5 Claims. (Cl. 280—457)

This invention relates to chain anchoring devices, and more particularly to safety chain link-engaging apparatus for hitches.

The practice of providing a safety chain across the hitch between a pulling vehicle and trailer to prevent detachment in case of hitch failure is well known desirable safety practice and is sometimes required by law. Heretofore, difficulty has often been encountered in locating a suitable member on the pulling vehicle to which a safety chain may be quickly and conveniently secured. In addition, tools generally have been necessary to secure or adjust the length of the safety chain and, in the absence of such tools, delays and difficulty have resulted as well as the danger of chain disengagement.

It is the principal objects of the present invention to provide a safety chain link-engaging apparatus which permits the securing of a safety chain with ease and facility; to provide such a device which permits chain engagement, disengagement and length adjustment with hitherto unknown convenience and speed; to provide such a device in which it is virtually impossible for the chain to vibrate or shake out of safe engagement; to provide such a device wherein a simple padlock becomes highly effective in theft prevention but the padlock is not relied upon to support a load; to provide a chain anchoring device which is useful in most applications where a chain must be safely secured and disengaged rapidly and with ease; to provide apparatus of this type wherein tools are not required for engagement, disengagement or length adjustment of the chain; and to provide such a device which is extremely simple in construction, easily combined with convenitonal hitches such as ball hitches, and is reliable in use.

Other objects and advantages of this invention will become apparent from the following description taken in connection with the accompanying drawings wherein are set forth by way of illustration and example certain embodiments of this invention.

Figure 1:
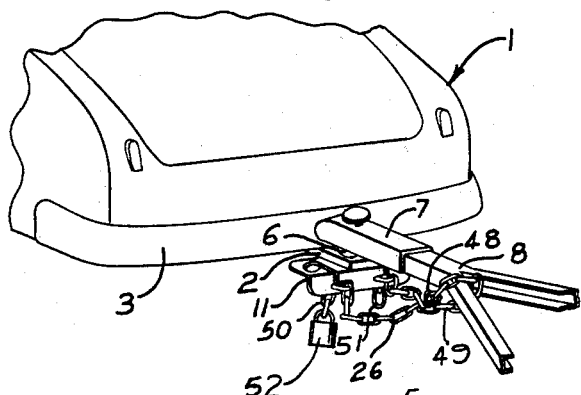
FIG. 1 is a fragmentary perspective view on a reduced scale of a pulling vehicle having a ball hitch and a safety chain link-engaging apparatus which embodies this invention secured to the ball hitch.
Figure 4:
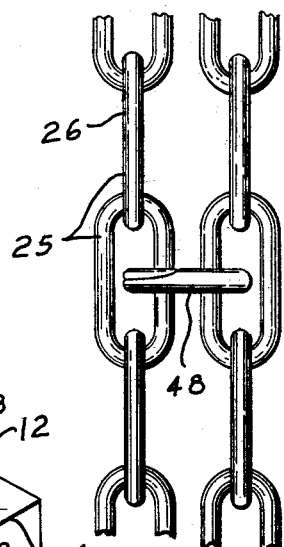
FIG. 4 is a fragmentary view showing a lap-link adapted to permanently secure the safety chain to a trailer draw frame.
Figure 2:
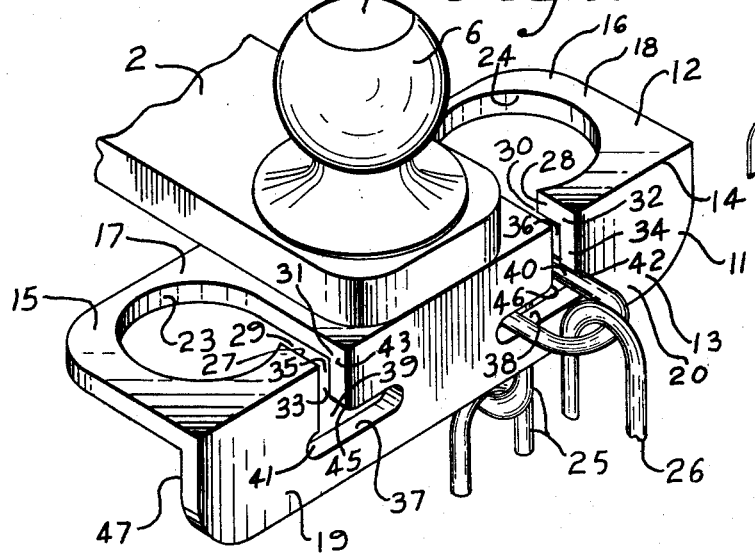
FIG. 2 is a fragmentary perspective view showing the hitching ball and pulling vehicle joining member with the link-engaging apparatus embodying this invention secured thereto.

A pulling vehicle, in the illustrated example an automobile 1, has a suitable joining member in the form of a draw bar 2 secured to the rear bumper 3 thereof in any appropriate manner. The draw bar 2 extends rearwardly of the bumper 3 and has a vertically extending bore 4 therethrough adapted to receive a threaded stud or anchor bolt 5 of a hitching ball 6. The hitching ball 6 is engaged with a ball connector 7 (FIG. 1) suitably secured to the draw frame 8 of a trailer (not shown). The stud or anchor bolt 5 extends downwardly through the joining member 2 and engages with a nut 9 to secure the hitching ball 6 in fixed relation to the draw bar 2. A suitable cotterpin 10 prevents an accidental disengagement of the nut 9 from the anchor bolt 5.

A member or angle bar 11 has a horizontally extending portion or leg 12 and a vertically extending portion or leg 13 secured to the horizontally extending leg 12 along a horizontal common edge 14. The angle bar 11 extends laterally of the hitching ball 6 forming oppositely disposed ears 15 and 16. The ears 15 and 16 respectively have horizontal portions 17 and 18 and vertical portions 19 and 20 located on opposite sides of the hitching ball 6.

A bore 21 extends vertically through the horizontally extending leg 12 between the ears 15 and 16 and is adapted to receive the anchor bolt 5 between the hitching ball 6 and the nut 9 for securing the angle bar 11 to the draw bar 2. A suitable lock washer 22 is located between the angle bar 11 and nut 9 to prevent unwanted relative rotation of the nut 9 which would result in a loosening of the angle bar 11. It is noted that the hitching ball 6, draw bar 2 and angle bar 11 may be welded together, if desired.

In the illustrated structure, substantially circular openings 23 and 24 respectively extend vertically through each of the horizontal ear portions 17 and 18 and are a size which permits the links 25 of a safety chain 26 to be freely received thereinto. First slots 27 and 28 are respectively located in the horizontal ear portions 17 and 18 and communicate at one end 29 and 30 respectively thereof with the openings 23 and 24. The first slots 27 and 28 extend horizontally and perpendicularly to the common edge 14 and terminate at the respective other ends 31 and 32 thereof in the vertical ear portions 19 and 20.

Second slots 33 and 34 are respectively located in the vertical ear portions 19 and 20 and communicate at the ends 35 and 36 thereof with the other ends 31 and 32 of the first slots 27 and 28. The second slots 33 and 34 extend vertically and perpendicularly to the common edge 14.

Figure 3:
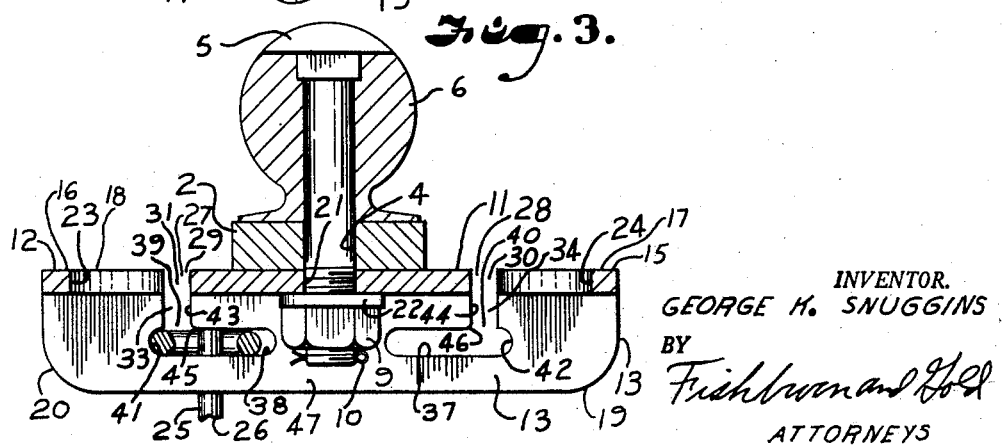
FIG. 3 is a cross-sectional view through the apparatus of FIG. 2 showing details of the link-engaging apparatus embodying this invention.

Third slots 37 and 38 are located respectively in the vertical ear portions 19 and 20 and extend horizontally thereof a distance slightly greater than the width of a chain link 25, FIG. 3. The other ends 39 and 40 of the second slots 33 and 34 communicate with the respective third slots 37 and 38 at a position intermediate the ends of the third slots 37 and 38 but offset from the center thereof. The third slots 37 and 38 are blind except for the communication with the second slot ends 39 and 40. The offset locations of the second slot ends 39 and 40 produce undercut portions 41 and 42 respectively adjacent the ends 39 and 40 for a purpose discussed hereinafter.

The slots 27, 28, 33, 34 and 37 and 38 have a transverse width slightly greater than the thickness of the safety chain links 25 whereby the ends of the safety chain 26, after being freely received in the respective openings 23 and 24, may be threaded along the slots communicating therewith and rested in the respective third slots 37 and 38 for anchoring the safety chain with respect to the draw bar 2. Inner walls 43 and 44 respectively of the second slots 33 and 34 are slightly rounded at the lower portions 45 and 46 thereof to provide ease of ingress and egress for the chain links 25.

By resting selected chain links 25 in the third slots 37 and 38, the chain becomes anchored or keyed therein since the link behind the slot-engaging link engages the back surface 47 of the vertically extending leg 13 when tension is applied to the chain. The undercut portions 41 and 42 tend to prevent the movement of the links 25 from the slots 37 and 38 during swinging or vibration of the chain. Because the links 25 must be moved through three separate angular directions before seating in the third slots 37 and 38, it is virtually impossible for the links to be accidentally disengaged therefrom. However, when disengagement is desired, a very simple but restrictive manipulation of the links will translate same to the openings 23 and 24, permitting the chain to be adjusted in length or removed with great ease and facility.

It is often desirable that the safety chain 26 be permanently connected to the trailer draw frame for convenience in locating the chain when needed. The chain 26 is shown wrapped around one leg of the trailer draw frame 8, and a lap-link 48 is connected between selected links 25 to form a closed loop 49. In this manner of connection, the ends 50 and 51 are free for insertion into the openings 23 and 24 when required.

To prevent theft of a trailer, it is often desirable to provide means for locking the trailer to the pulling vehicle. The invention above-described lends itself well to such a provision by permitting a padlock 52, which has a body too large for passage through an opening 23 or 24, to be secured to one of the links of the chain 26 which has been passed through a respective opening, FIG. 1. If desired, the end links on the chain ends 50 and 51 may be padlocked together for further protection. It is noted that a load is never placed on the padlock 52 since tension on the safety chain 26 can only be applied up to the links engaged in the third slots 37 and 38.

It is to be understood that for purposes of explanation my invention has been described as a safety chain engaging apparatus for ball hitches. However, those skilled in the art will recognize that the unique combination of openings and slots may be used in many other applications where it is necessary to quickly engage and disengage the links of a chain and provide length adjustment therefor without danger of such chain shaking loose. It is to be further understood that my invention is not to be limited to the specific form or arrangement of parts herein described and shown except insofar as such limitations are included in the claims.

What I claim and desire to secure by Letters Patent is:

1. Chain link-engaging apparatus comprising:
   (a) a member having a horizontal and a vertical portion,
   (b) an opening extending through said horizontal portion and of a transverse size adapted to freely receive chain links therethrough without contacting said member,
   (c) a first slot located in said horizontal portion and communicating at one end thereof with said opening, said first slot terminating at the other end thereof in said vertical portion,
   (d) a second slot located in said vertical portion and communicating at one end thereof with the other end of said first slot,
   (e) a third slot located in said vertical portion and extending transversely to said second slot having a length slightly greater than the width of a chain link, the other end of said second slot communicating with said third slot at a position offset from the center of said third slot,
   (f) said first, second and third slots having a transverse width slightly greater than the thickness of a chain link but smaller than the width of a following chain link whereby a chain link is freely receivable in said opening and threadable along said first and second slots and restable in said third slot for anchoring chain.

2. Chain link-engaging apparatus comprising:
   (a) a member having a horizontally extending leg and a vertically extending leg secured to said horizontally extending leg along a common edge,
   (b) said member forming oppositely disposed ears, said ears respectively having horizontal and vertical portions,
   (c) an opening extending through each of said horizontal ear portions and of a transverse size adapted to freely receive chain links therethrough without contacting said member,
   (d) a first slot located in each of said horizontal ear portions and communicating at one end thereof with said respective openings, said first slots terminating at the other end thereof in said respective vertical ear portions,
   (e) a second slot located in each of said vertical ear portions and communicating at one end thereof with the other end of said respective first slots,
   (f) a third slot located in each of said vertical ear portions and extending horizontally and having a length slightly greater than the width of a chain link, the other end of said second slots communicating with said respective third slots at a position offset from the center of said respective third slots,
   (g) said first, second and third slots having a transverse width slightly greater than the thickness of a chain link but smaller than the width of a following chain link whereby chain links are freely receivable in said respective openings and selected links are threadable along said first and second slots and restable in said third slots for anchoring chain.

3. Safety chain link-engaging apparatus for ball hitches having a hitching ball and a threaded ball stud extending downwardly through a vehicle-joining member and secured by a nut engaged with said stud, said apparatus comprising:
   (a) an angle bar having a horizontally extending leg and a vertically extending leg secured to said horizontally extending leg along a horizontally extending common edge,
   (b) said angle bar extending laterally of said hitching ball and forming ears, said ears respectively having horizontal and vertical portions and being located on opposite sides of said hitching ball,
   (c) a bore extending vertically through said horizontally extending leg between said ears and adapted to receive said stud for securing said angle bar adjacent said vehicle-joining member,
   (d) an opening extending vertically through each of said horizontal ear portions and adapted to freely receive safety chain links,
   (e) a first slot located in each of said horizontal ear portions and communicating at one end thereof with said respective openings, said first slots extending horizontally and perpendicularly to said common edge and terminating at the other end thereof in said respective vertical ear portions,
   (f) a second slot located in each of said vertical ear portions and communicating at one end thereof with the other end of said respective first slots, said second slots extending vertically and perpendicularly to said common edge,
   (g) a third slot located in each of said vertical ear portions and extending horizontally thereof a distance slightly greater than the width of a chain link, the other end of said second slots communicating with said respective third slots at a position offset from the center of said respective third slots.
   (h) said first, second and third slots having a transverse width slightly greater than the thickness of a safety chain link whereby said chain links are freely receivable in said respective openings and threadable along said first and second slots and restable in said third slots for anchoring said chain with respect to said hitch.

4. The apparatus of claim 3 wherein:
   (a) said second slots communicate with said third slots intermediate the ends thereof.

5. Chain link-engaging apparatus comprising:
   (a) an angle bar member having a first flange with a first slot having opposite open ends and adapted to receive a chain link therein,
   (b) said member having a second flange angularly disposed to said first flange forming an intersection therewith, said second flange having a second slot having opposite open ends, one of said second slot open ends being in common with one of said first slot open ends at said intersection, an opening in said first flange for receiving a chain thereinto, said opening communicating with the other of said first slot open ends, (c) said member having a third slot in said second flange, said third slot extending transversely of said second slot and having a length slightly greater than the width of a chain link, said second slot communicating with said third slot at the other open end of said second slot and at a position offset from the center of said third slot, (d) said first, second and third slots having a transverse width slightly greater than the thickness of a chain link but smaller than the width of a following chain link whereby a chain link is threadable along said first and second slots and restable in said third slot for anchoring chain.

References Cited in the file of this patent

UNITED STATES PATENTS

| | | |
|---|---|---|
| 77,587 | Colborn | May 5, 1869 |
| 1,866,813 | Lindvall | July 12, 1932 |
| 2,165,377 | Henry | July 11, 1939 |
| 2,721,087 | Pearson | Oct. 18, 1955 |
| 2,998,982 | Brazil | Sept. 5, 1961 |